Figure 1:
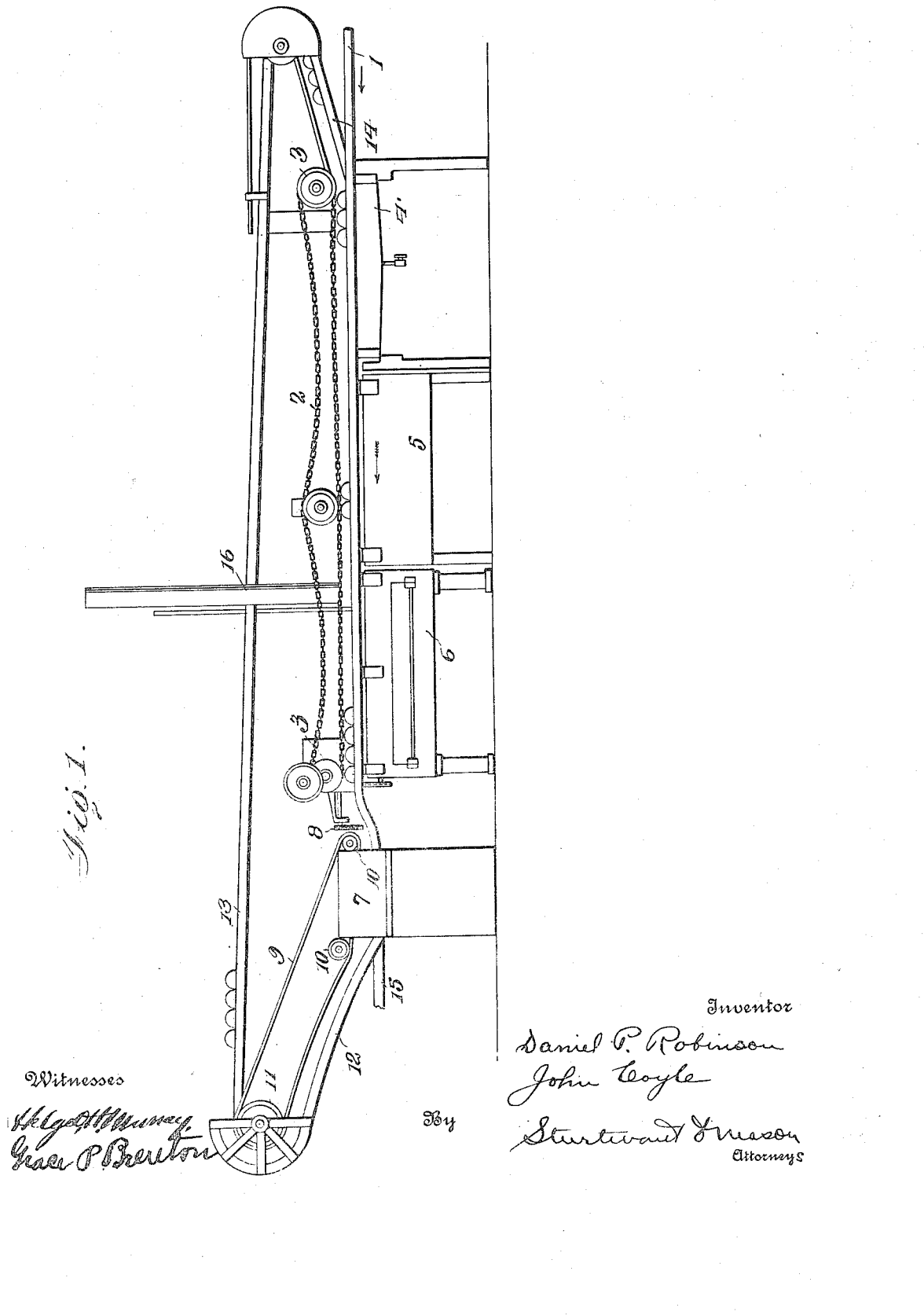

D. P. ROBINSON & J. COYLE.
SOLDERING MACHINE.
APPLICATION FILED MAR. 2, 1912.

1,193,425.

Patented Aug. 1, 1916.
4 SHEETS—SHEET 1.

Witnesses

Inventor
Daniel P. Robinson
John Coyle
By Sturtevant & Mason
Attorneys

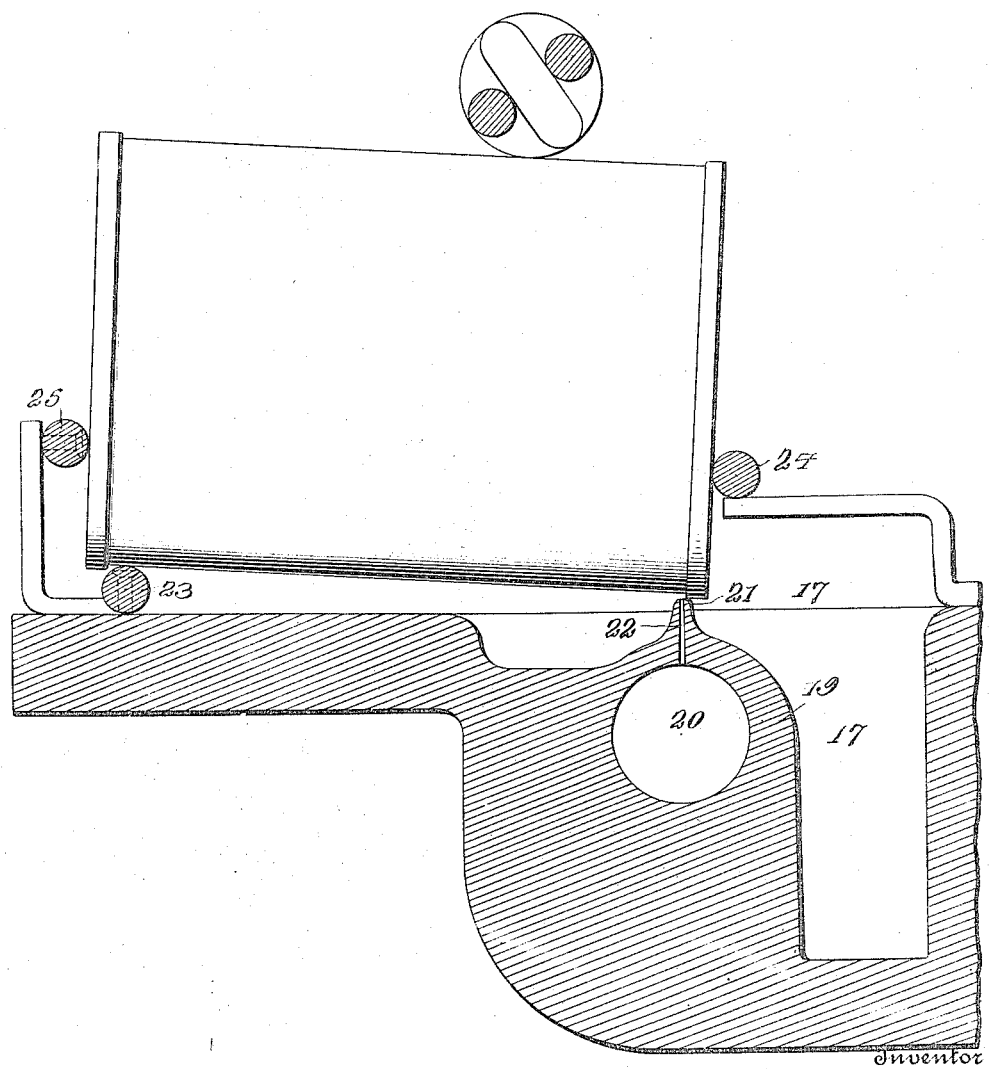

D. P. ROBINSON & J. COYLE.
SOLDERING MACHINE.
APPLICATION FILED MAR. 2, 1912.

1,193,425.

Patented Aug. 1, 1916.
4 SHEETS—SHEET 3.

D. P. ROBINSON & J. COYLE.
SOLDERING MACHINE.
APPLICATION FILED MAR. 2, 1912.
1,193,425.
Patented Aug. 1, 1916.
4 SHEETS—SHEET 4.
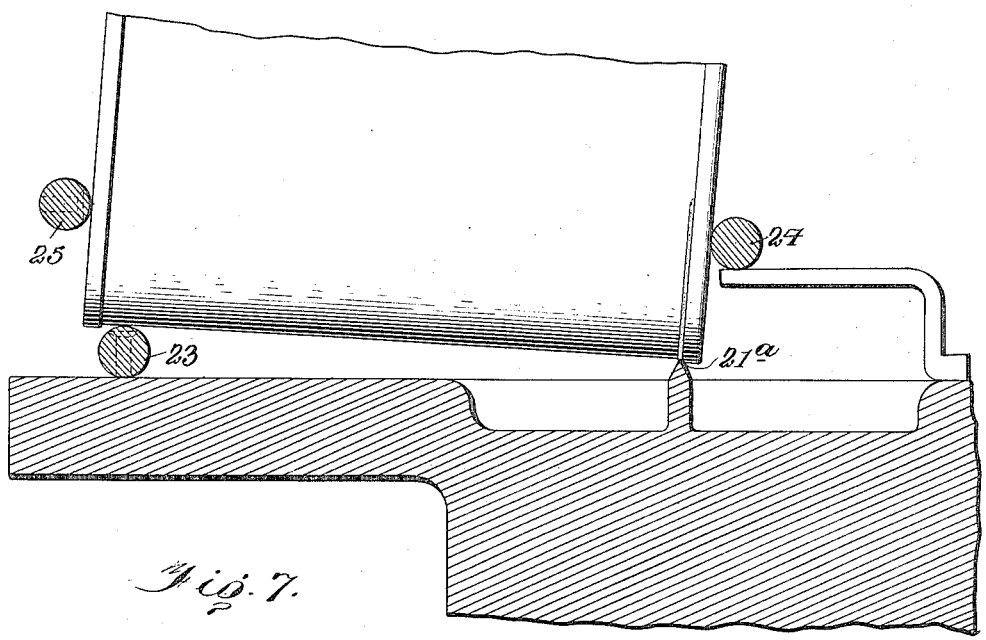
Fig. 7.
Fig. 8.
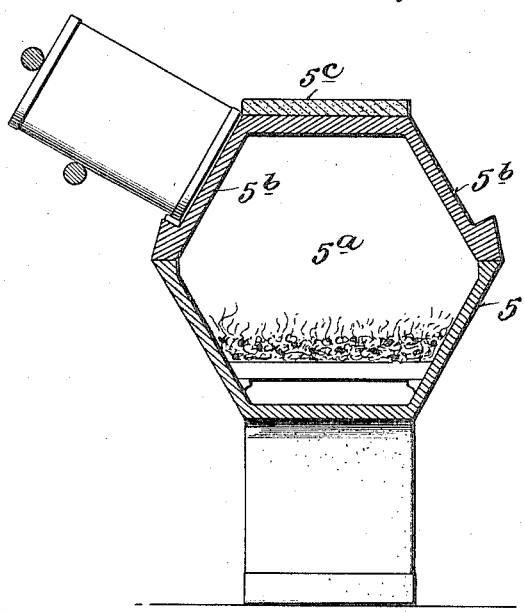
Witnesses
Helge Ott Murray
Grace P. Brereton
Inventor
Daniel P. Robinson
John Coyle
By Sturtevant & Mason
Attorneys

UNITED STATES PATENT OFFICE.

DANIEL P. ROBINSON AND JOHN COYLE, OF BALTIMORE, MARYLAND, ASSIGNORS, BY MESNE ASSIGNMENTS, TO CONTINENTAL CAN COMPANY, INC., A CORPORATION OF NEW YORK.

SOLDERING-MACHINE.

1,193,425.  Specification of Letters Patent.  Patented Aug. 1, 1916.

Application filed March 2, 1912. Serial No. 681,133.

*To all whom it may concern:*

Be it known that we, DANIEL P. ROBINSON and JOHN COYLE, citizens of the United States, residing at Baltimore, in the State of Maryland, have invented certain new and useful Improvements in Soldering-Machines, of which the following is a description, reference being had to the accompanying drawing, and to the letters and figures of reference marked thereon.

The invention relates to new and useful improvements in machines for soldering ends on sheet metal cans, and more especially to machines of the character where the solder is applied to the end in a molten state.

Prior to this invention, it has been common to use a solder bath for applying molten solder to the joint between the end and the can body. By machines of this character, the cans may be very rapidly soldered and at small cost of labor, but at considerable waste of solder, owing to the fact that the immersion of the corner of the can in the molten solder to the necessary depth to cause the solder to properly cover the joint, causes a coating of solder to adhere to the outside periphery of the can end, and to a narrow belt of the can body surface above the can end flange, and also to the outer annular surface of the flat surface of the can end. Furthermore, by this immersion method of applying solder to the can, more or less solder is caused to flow inside the can, owing to the fact that the tilted can body when immersed displaces the molten solder so that the corner of the can body at the soldering point is beneath the plane of the surfaces of the molten solder, and therefore, at the side seams or other points where the head does not snugly engage the can body, the molten solder will run into the can. It has also been proposed to provide means in connection with the solder bath to restrict the bath or form a bead of molten solder along which the can end may be rolled, and thereby avoid the objections incident to the immersion of the corner of the can end in the bath. While this method of applying solder to the can end avoids to a large extent, the coating of the annular face of the can end, it is found in practice that if the bead is made sufficiently large to close the joint at the side seams or other points where the head does not snugly engage the can body, that an unnecessary amount of solder is applied to the joint, which adds nothing to the security of the joint but on the other hand, detracts from its appearance. If this bead along which the joint is rolled is reduced in size so as not to supply this unnecessary quantity of solder for the normal conditions in the joint, it is found that where there are slight imperfections so that the flange of the end does not fit snugly the body of the can, the joint will not be closed and there will be resulting leaks.

An object of the present invention is to provide means whereby the molten solder may be applied to the joint between the can end and the body of the can, and caused to roll or flow about the joint as the can is rolled in contradistinction to this rolling of the can end joint in a bath, or along a bead of molten solder. Where a globule of molten solder is applied to the joint between the can end and the can body and caused to roll or flow along the joint as above noted, said molten solder will fill the spaces between the flange of the end and the body of the can, regardless of the size of these spaces, and in its continued rolling or flowing about the joint, practically only the solder required to fill the joint is taken up by the can body. All objectionable pressure at the point of applying the solder which forces the solder to the inside of the can as occurs where the corner of the can is immersed, is avoided by this construction. Furthermore, by applying globules of molten solder at spaced intervals along a track on which the can end is rolling, the amount of solder applied to the can end may be regulated so as to avoid all the objections above noted, in connection with the rolling of the end joint along a bead of molten solder.

A further object of the invention is to provide a new method of soldering can ends to can bodies, wherein the solder in globular form and in molten condition, is caused to roll or flow about the end seam of the can body, and is held thereto by adhesion, so that the molten solder through capillary attraction may be caused to fill the joint.

In the drawings which show by way of illustration one embodiment of the invention; Figure 1 is a side elevation showing more or less diagrammatically the general arrangement of the parts of the machine embodying the invention described; Fig. 2 is an enlarged sectional view through the solder applying devices; Fig. 3 is a view partly in plan and partly in section, showing the solder applying devices and the means for feeding the solder thereto, but omitting the guide for the inner ends of the cans. Fig. 4 is a longitudinal partly sectional view through the solder applying devices, showing the jets of solder for applying the globules of molten solder to the end joint; Fig. 5 is an enlarged cross sectional view, showing the track along which the can body is rolled; Fig. 6 is a similar view showing a globule of molten solder taken up by the can body as it passes a jet, and said globule in the position in which it rolls about the end joint; Fig. 7 is an enlarged sectional view similar to that of Fig. 2, but taken at a point beyond the solder-applying region. Fig. 8 is a transverse sectional view through the preheater.

In carrying out the invention, devices are provided whereby the can body with the end thereon, is presented first to a flux bath, and then to a preheating device where the parts of the metal to receive the solder are heated, and then to the improved solder applying devices, and from the solder applying devices to a wiping device where the surplus solder is removed, after which the can is again carried to the front end of the machine and the opposite end caused to pass in succession to the fluxing bath, the preheater, the soldering devices and the wiping means so that first one end of the can body and then the other is soldered.

Referring more in detail to the drawings, Fig. 1 shows a soldering machine which embodies a suitable supporting frame on which is mounted a run-way 1 along which the cans are conveyed to the soldering mechanism. This run-way consists of suitable supporting angle bars. The run-way through the soldering machine is substantially horizontal, and the cans are carried along this horizontal run-way by a conveyer 2. This conveyer as herein shown, is of the link chain type, although it is obvious that any other form of conveyer may be used for this purpose.

The conveyer chain 2 runs over suitable pulleys 3, 3, and the pulley at the left hand of the machine as viewed in Fig. 1, is driven from some suitable source of power. This conveyer chain 2 rests by gravity on top of the can bodies, and if the can bodies are round, will cause the same to run along the supporting run-way for said bodies.

The can bodies which are carried along the run-way 1, are first brought to fluxing bath 4, which may be of the usual type and will not need description in detail. The joint between the can end and the body is here properly fluxed preparatory to receiving the solder. After passing the fluxing bath, the can is carried to the preheater 5. The preheater 5 includes a heating chamber 5ª and side runways of metal 5ᵇ. At the top said chamber is covered by asbestos 5ᶜ. This causes a uniform heating of the joint and end, without over-heating any of the parts. From the preheaters the cans are delivered to the soldering devices 6. After leaving the soldering devices, the can bodies pass along the runway 1, which is inclined downwardly beyond the end of the conveyer 2, so that said bodies will run down into the wiping apparatus.

The wiping apparatus is indicated at 7 and may be of any well known construction. The wiping apparatus may be operated by the gear indicated at 8 in the drawings. The can bodies are carried through the wiping apparatus by a conveyer belt 9, which passes over suitable pulleys 10 at each end of the apparatus, and also over a suitable pulley 11 mounted on the framework of the machine.

The cans, after leaving the wiping apparatus, are caused to travel up the inclined run-way 12, and are delivered on to the runway 13 by which the cans are brought again to the front of the machine, and through the run-way 14 delivered to the opposite side of the machine, so that the other ends of the cans may pass in succession through the fluxing bath 4, the preheater 5, the soldering devices 6, and the wiping apparatus 7, after which the cans are discharged from the machine along the run-way 15. The soldering devices 6 as herein shown, consist of a suitable heating chamber having a vent pipe 16. This heating chamber is located directly underneath the solder receptacle 17. The solder receptacle extends along each side of the machine directly under the run-way for the cans, and a central partition extends from one end thereof to a point short of the other end, thus dividing the receptacle, but at the same time allowing the divided parts to be connected. Extending along the side of the bath, is a partition 19 which forms a closed chamber 20. A similar partition extends along the other side of the receptacle, and forms a similar chamber 20. The solder receptacle is heated by the chamber beneath the same, and the solder therein will be kept in a molten condition. Each of the chambers 20, at its upper face is formed with a rib 21 which extends the length of the chamber, and forms a track along which the can body is rolled. This track is curved at its upper edge, and at spaced intervals is formed with openings 22, which lead to the chamber 20. The opposite end of the can body rolls along a second track 23 and these tracks are so disposed that the can body inclines downwardly slightly toward the track 21. A guiding rod 24 carried by a suitable bracket mounted on the solder holding receptacle, engages the end of the can body and guides the same as it rolls along the track 21, so that the edge of the flange of the can end is adjacent the center of the track. A second guide rod 25 engages the other end of the can and holds the same properly positioned relative to the track 21.

In order that the chamber 20 may be kept filled with molten solder, and the solder caused to flow through the openings 22 and rise therefrom in small jets 26, means is provided for forcing the molten solder from the receptacle into the chambers 20. As herein shown, said means consists of a pump 27, which forces molten solder through pipes 28 to the chambers 20. This pump consists of two gear wheels 29 and 30, which intermesh and rotate in suitable pumping chambers formed therefor. The molten solder passes from the receptacle through the pump 27 and is delivered into the pipes 28 which lead to the chambers 20. These gear wheels forming the pump may be rotated by any suitable means. This means of supplying the solder to the chambers 20 and causing jets to issue from the openings in the track, forms no part of the present invention, and it is to be understood that any well known means may be employed for placing the molten solder in the chamber under sufficient pressure for accomplishing the desired result. The action of this pump may be so regulated that the jets 26 rising through the openings 22, will be only sufficient to supply the solder taken up by the can bodies as they roll over the same. If however, there is an excess of solder issuing from the jets, it will flow over the side of the track back into the receptacle 17.

In the operation of the device, the receptacles on each side of the solder feeding and applying track, are provided with solder which is kept in a molten condition, and this molten solder is forced by the pump into the chambers and caused to rise in small jets through the openings in the track. The can body, after passing through the fluxing bath and the preheater, and while the joint between the can end and can body is in heated condition, is caused to roll along the track 21. As the can body passes over a jet of solder issuing from the opening in the central part of the track, a globule of solder will adhere to the can body and can end at the joint thereof, and roll or flow along the joint as indicated in Fig. 6 of the drawings. This globule of solder shown at 31, is in the rear of the can body as it rolls along the track, and partly rests on the track and is partly supported by the can body through adhesion and capillary attraction. The effective result is that the globule of solder is supported by the can body and rolls or flows along the joint in the same, and the track directs the movements of the globule of solder so that the same keeps to the joint. This rolling or flowing of the globule of solder along the outer surface of the can body at the joint between the can body and the can end, will cause all the spaces between the flange of the can end and the can body to be filled with solder, notwithstanding the fact that this space in the joint may vary in size, owing to the side seams or other irregularities in the flange or the can body. While these cavities or recesses are filled with solder, said solder is free from pressure and therefore, the solder will not run through to the inside of the can, but will merely fill the joint between the flange of the can end and the can body. In other words, where the wall of the can body is adjacent the flange of the can end, there will be sufficient capillary attraction to cause a flow of the solder from the globule between the adjacent surfaces of the tin, and the space will be entirely filled, but there will be no force to carry any molten solder on into the can body. As this globule rolls or flows around the joint therefor, solder will be applied only to the flange and the can body at a point adjacent the edge of the flange, and the end face of the can end will be kept free from solder. The track may be provided with as many jets as may seem desirable, in order to supply in succession, the globules of solder which will be caused to flow or roll about the end joint, until said end joint is thoroughly filled with solder.

It will be apparent from the above description, that the present apparatus and method of soldering differs from those heretofore practised, wherein the can end is caused to roll in a bath of solder or along a bead of solder, in that the solder in the present apparatus and method is in effect applied to the end joint and caused to flow or roll about the end joint in globular form.

The track 21 instead of being convex throughout its entire length, is preferably brought to substantially a point in cross section, as at 21ª. This materially restricts the surface contact between the track and the can body, and also restricts the amount of surface at the sides of the joint covered by solder. This portion of the track 21ª is over the heating chamber so that said track is heated. The solder picked up in globular form by a can rolling over a jet, will flow along the convex surface of the heated track on to the more restricted surface of the heated section 21ª, and therefore, the solder will be applied to the end joint in proper relation thereto, and the amount of coated surface will be materially restricted.

From the above construction, it will be apparent that we have provided a soldering device wherein little or no solder will pass to the inside of the can body, which would cause not only a waste of solder, but unsanitary conditions in the can, owing to the large per cent. of lead contained in solder. Then again, by the above-described devices, little or no solder is applied to the can other than at the joint, and therefore, the can soldered by these devices is neat in appearance. The small amount of solder applied to the joint also renders the described method of soldering cans very economical. While we have also described the can as rolling along the support, it is obvious that the invention may be applied to the soldering of square cans, in which case the jet of solder will cause a globule of solder to be carried along the end seam and roll or flow about the corners of the can, in the manner above described.

It is obvious that minor changes in the details of construction may be made, without departing from the spirit of the invention, as set forth in the appended claim.

Having thus particularly described our invention, what we claim as new and desire to secure by Letters Patent, is:—

A soldering machine including in combination, a solder receptacle in which solder may be kept in molten condition, a track having a plurality of unobstructed spaced openings therein and leading to said receptacle, means for causing the solder in said receptacle to issue in continuous jets from the openings in said track, means for rolling cans along said track, whereby a globule of molten solder is caused to adhere to each can and roll or flow along the end joint and along the track.

In testimony whereof we affix our signatures in presence of two witnesses.

DANIEL P. ROBINSON.
JOHN COYLE.

Witnesses:
J. C. TALIAFERRO,
DANL. CINNAMOND.